Aug. 5, 1969
C. R. CLYDE
3,459,208
CYCLING VALVE
Filed Feb. 6, 1967
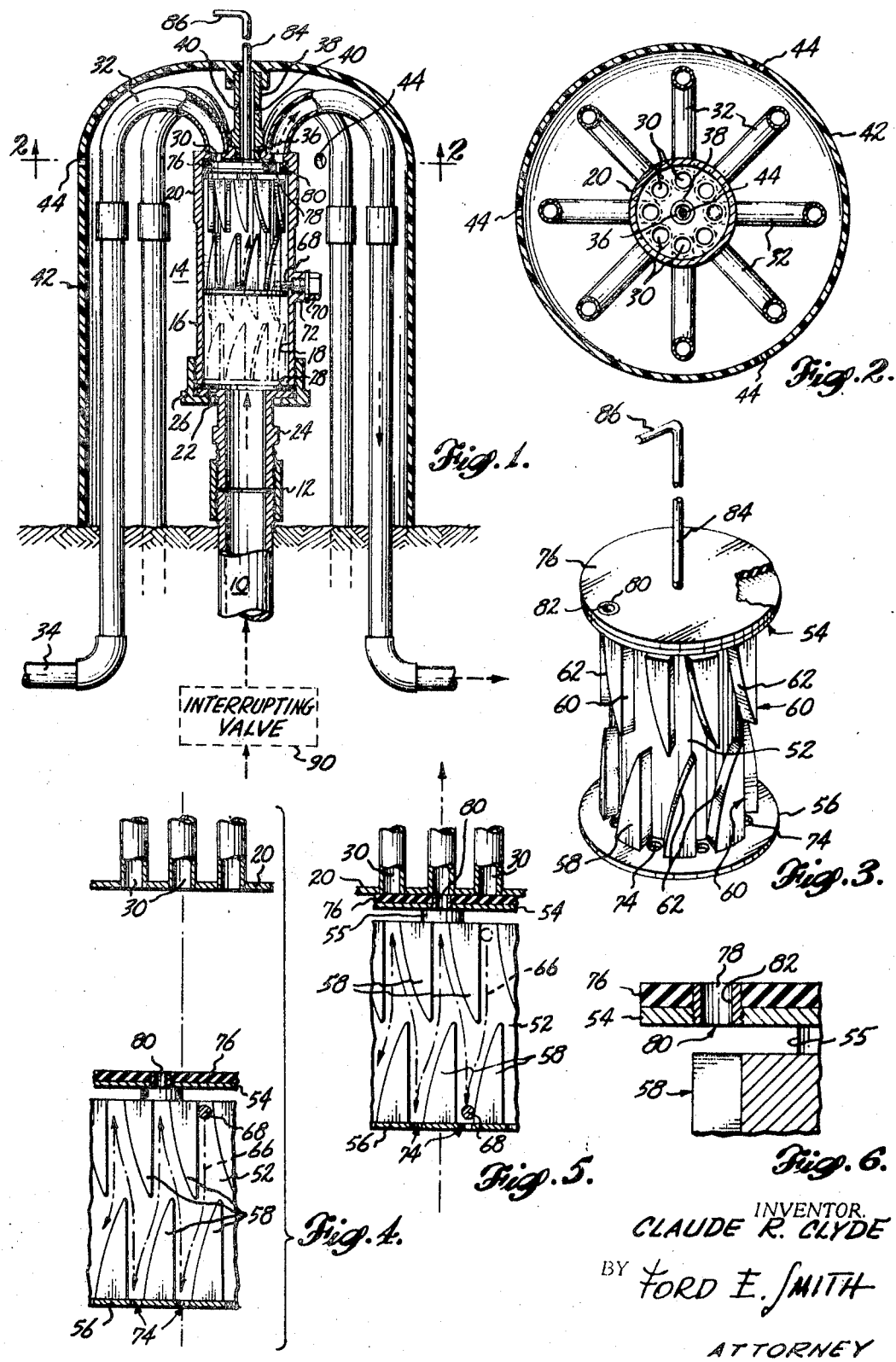
INVENTOR.
CLAUDE R. CLYDE
BY Ford E. Smith
ATTORNEY

United States Patent Office 3,459,208
Patented Aug. 5, 1969

3,459,208
CYCLING VALVE
Claude R. Clyde, 909 W. Emerson St.,
Seattle, Wash. 98119
Filed Feb. 6, 1967, Ser. No. 614,265
Int. Cl. F16k 21/00, 31/12
U.S. Cl. 137—119                                    5 Claims

ABSTRACT OF THE DISCLOSURE

A valve apparatus for sequentially passing fluid under pressure between a lower inlet and a series of upper outlets. A ported plunger in a chamber between the inlet and outlets is indexed by pressure pulses of the fluid supplied to said inlet.

BACKGROUND

There is a need for a simple, trouble-free valve that may be remotely located and is automatically operable to pass fluid under pressure from a single source to a plurality of distribution conduits in predetermined cycles wherein the valve is caused to operate by interruptions of the fluid supply pressure providing pressure pulses. Such a valve will find, typically, a substantial field of use in multiple conduit overhead irrigation systems. More specifically there is a need for a cycling valve for use in sprinkler systems for lawns, golf courses, home gardens and the like where there is a limited supply of water available usually at limited pressure. Under such circumstances an adequate overall distribution system is not suitably operated in toto. A cycling valve permits the system to be divided into portions which, operated along, will appropriately function with a given supply and pressure of supply water. While various plunger-type valves operable by pressure pulses are known, none having an indexable plunger operable relative a plurality of concentric outlets in a valve casing head are known to have a single movable part capable of producing appropriate cycling and which is simple of construction and operation in a trouble-free manner. Nor is it known to provide a cycling valve which may be manually re-set and which provides visible indicia of a given disposition of the control member at all times.

DESCRIPTION

In the drawings:

FIGURE 1 is a vertical sectional view of a cycling valve showing its incorporation in a multiple conduit fluid distribution system;

FIGURE 2 is a cross-section in the plane 2—2 of FIGURE 1;

FIGURE 3 is a perspective view of the valve plunger;

FIGURES 4 and 5 diagrammatically show the plunger-plural outlet relations effected by pressure pulses; and FIGURE 6 is an enlarged cross-section in detail of plunger fluid passage.

An upright supply pipe 10 rises from the ground and by coupler 12 supports the valve body 14 in an upright manner. The valve body comprises the casing 16 forming an upright hollow cylindrical chamber 18 having upper head 20 and lower closure gap 22, preferably a flange on nipple 24 threadedly coupled to sleeve 12. Collar 26 embraces cap 22 and is coupled by threads to casing 16. A washer 28 seals the coupling in a fluid tight manner.

The head 20 of the valve body has a plurality of outlets 30 arranged concentric of the axis of chamber 18. An arched conduit 32 extends from each outlet 30 outward and downward and is coupled in a conventional manner to a distribution conduit 34 of, for example, an irrigation system.

A vacuum breaker passage 36 is preferably located in head 20 at the axis of chamber 18 and an upstanding nipple 38 ported at 40 stands thereabove.

The dome shaped casing 42 screws onto the upper end of nipple 38 and encases the cascade of arched conduits 32, extending substantially to the ground level as protection for the assembly. Casing 42 has air passages or vents 44 to the atmosphere.

Within chamber 18 is plunger 50 best seen in FIGURE 3 which comprises a body 52 having upper and lower flanges 54 and 56 respectively at its ends of equivalent dimensions to the cross-section dimension of chamber 18. Upper flange 54 is spaced by boss 55 from the upper end of plunger body 52. On its exterior, body 52 has two opposed series of toothed cam elements 58.

Each cam element 58 has a generally flat surface 60 and a curved surface 62 which meet to form a point 64. The elements 58 of the lower series upstand from the lower end of body 52 to approximately its middle. The elements 58 of the upper series are arranged to oppose the lower series and likewise terminate approximately at the middle of body 52. By this arrangement a tortuous, zig-zag path 66 is provided around the exterior of the plunger body 52. The two series of cam elements are so proportioned and arranged that path 66 is endless.

A cam follower pin 63, disposed in the zig-zag path described, instands at a fixed location from the valve body wall forming chamber 18. Pin 68 is an extension of screw plug 70 threaded into boss 72 on the body 14.

Flange 56 has a series of ports or passages 74 which permit fluid to flow from beneath flange 56 into the grooves between cam elements 58 and upward into head space between body 52 and flange 54. A resilient valve disc 76 is superposed on flange 54 and a fluid passage 78 is formed therein coincident with passage 80 in flange 54. Preferably collar 82 rises from passage 80 through disc passage 78 to reduce wear and insure passage registry.

The location of passages 78, 80 relative the axis of chamber 18 is coincident with concentric spacings of plural outlets 30 relative the same axis.

A rod 84 rises from the center of plunger body 52 and passes upward and out through the axial passage 36 in nipple 38. Its upper end may be bent as 86 to form a handle and a pointer which is accessible external of the valve 14 and casing 42.

OPERATION

When water under pressure is supplied to inlet conduit 10 it enters chamber 18 and raises plunger 52 until disc 76 abuts the underside of head 20. Passage 80 registers with one of the several openings 30. Water escaping from beneath the plunger 52 through passages 74 flows upward through and around the cam elements 58 into the head space beneath flange 54. It then enters flange passage 78 and disc passages 80 and flows outward through the registered outlet 30 and its related conduits 32, 34.

Plunger 52 rises in a substantially straight line for about half its travel since cam follower pin 68 is adjacent a flat surface 60. At about the mid point of upward plunger travel pin 68 contacts the curved surface 62 of cam element 58 and partial rotation of body 58 occurs to produce final register of passage 80 with an outlet 30.

When the inflow of fluid is interrupted to inlet 10, the plunger descends due to the lack of pressure and velocity. The movement downward of plunger 52 moves the flat side of a lower cam element 58 relative pin 68 for about half the travel. Thus settling of the plunger is initially in a straight line, until contact between the next upper curved surface 62 is effected and again partial rotation of the plunger occurs. Upon the resumption of fluid flow, the remainder of plunger rotation is effected and registry of passages 80 and the next succeeding passage 30 obtains.

Fluid pulsing may be obtained remote from this apparatus either by manual operation of a main control valve or it may be had by use of a conventional timed interrupting valve 90 as indicated in FIGURE 1.

When fluid flow is terminated and plunger 52 settles in chamber 18 vacuum is broken by the inflow of air through passage 36. This avoids sucking back into the system any of the water or other fluid that may be in any of the several outlet conduits.

By means of rod 84 upstanding from the valve body 14, an operator may raise and lower plunger 52. In doing so he manually brings the cam and cam follower elements into play causing rotation of the plunger. The bent end 86 of rod 84 will serve to indicate the degree of rotation and will permit him to determine "blind" the registry of the plunger passages 78, 80 relative a desired outlet 30.

I claim:

1. A cycling valve for controlling the flow of fluid through a selected one of plural outlet passages from a common source, comprising:
   body means forming an upright hollow cylindrical chamber having a lower inlet and plural upper fluid outlet passages at the ends of the cylinder arranged concentric of its axis;
   a rotatable solid plunger in said chamber movable axially thereof relative said passages in response to the presence or absence of fluid under pressure therebelow; said plunger being of a diameter substantially less than the diameter of said chamber and having upper and lower flanges slidably fitting the wall of said chamber to guide said plunger in its axial movement within said chamber; the lower flange on said body being provided with port means located to pass fluid entering said chamber through said lower inlet passage to the space surrounding said plunger between said upper and lower flanges;
   cam indexing means on the exterior of said plunger and spaced from the wall of said chamber and a cam follower member instanding from said chamber wall operable to partially rotate the plunger upon each axial movement thereof;
   outlet closing means carried by said plunger for blocking the outflow of fluid through non-selected plural outlets when said plunger is at the upper limit of its travel; and
   said outlet closing means and said upper flange having at least one opening registrable with a fluid outlet passage upon each reciprocation of the plunger and adapted to pass fluid from the space surrounding said plunger to a selected outlet when said other outlets are blocked.

2. The structure according to claim 1, in which the upper fluid outlets are co-planar, and the outlet closing means comprises a resilient body carried on the head of the plunger.

3. The structure according to claim 1, in which the plunger indexing means comprises a zig-zag channel formed in the outer surface of the plunger, and a cam follower element is mounted to instand from the wall of the chamber in cooperable relation with said channel.

4. The structure according to claim 1 in which there is an outlet at the axis of said chamber head and a pin is carried by said plunger, said pin including means indicating the disposition of said one opening.

5. The structure according to claim 2, in which there is a radially arranged descending conduit associated with said upper fluid outlets and the assembly is encased in dome element.

References Cited

UNITED STATES PATENTS

| 1,326,046 | 12/1919 | Goodhue | 137—119 |
| 2,825,363 | 3/1958 | Bird | 137—625.46 XR |
| 3,018,788 | 1/1962 | Perlis | 137—624.11 XR |
| 3,369,565 | 2/1968 | Haggard | 137—624.18 XR |

WILLIAM F. O'DEA, Primary Examiner

WILLIAM H. WRIGHT, Assistant Examiner

U.S. Cl. X.R.

137—624, 625; 239—66; 251—56